(12) United States Patent
Lesser et al.

(10) Patent No.: US 9,342,539 B2
(45) Date of Patent: *May 17, 2016

(54) DATABASE MANAGER AND METHOD AND COMPUTER PROGRAM FOR MANAGING A DATABASE

(71) Applicant: Cinemo GmbH, Karlsruhe (DE)

(72) Inventors: Richard Lesser, Karlsruhe (DE); Ivan Dimkovic, Stuttgart (DE)

(73) Assignee: CINEMO GMBH, Karlsruhe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,330

(22) Filed: Dec. 5, 2014

(65) Prior Publication Data

US 2015/0088819 A1 Mar. 26, 2015

Related U.S. Application Data

(63) Continuation of application No. 14/450,393, filed on Aug. 4, 2014, now Pat. No. 9,002,884, which is a continuation of application No. 13/450,672, filed on Apr. 19, 2012, now Pat. No. 8,868,602.

(60) Provisional application No. 61/476,956, filed on Apr. 19, 2011.

(51) Int. Cl.
*G06F 17/30* (2006.01)

(52) U.S. Cl.
CPC .... *G06F 17/30289* (2013.01); *G06F 17/30106* (2013.01); *G06F 17/30386* (2013.01); *G06F 17/30424* (2013.01); *G06F 17/30575* (2013.01)

(58) Field of Classification Search
CPC .................... G06F 17/20106; G06F 17/30289; G06F 17/30424; G06F 17/30575; G06F 17/30386
USPC .................................................. 707/769, 770
See application file for complete search history.

(56) References Cited

U.S. PATENT DOCUMENTS

| 7,827,479 | B2 * | 11/2010 | Kali | 715/229 |
| 2006/0271683 | A1 * | 11/2006 | Ramaley et al. | 709/226 |
| 2007/0089057 | A1 * | 4/2007 | Kindig | 715/716 |

(Continued)

OTHER PUBLICATIONS

Lesser et al., "Database Manager and Method and Computer Program for Managing a Database", U.S. Appl. No. 13/450,672, filed Apr. 19, 2012.

(Continued)

*Primary Examiner* — Rehana Perveen
*Assistant Examiner* — Tiffany Thuy Bui
(74) *Attorney, Agent, or Firm* — Keating & Bennett, LLP

(57) ABSTRACT

A database manager comprises: a detector detecting a connection of an external database which comprises media files, a database file system comprising a media identifier comprising a file or directory path name and an identification on the location of the media file on the external database, and metadata for each of the media files; a database synchronizer reading and storing, as a first step, part of the database file system and, as a second step, part of the metadata when the at least a portion of the database file system is read; and a search request processor processing a search request for a media file in parallel with the second step, wherein the search request processor provides a search result based on the media identifier from the database file system, even when the metadata for the media file is not yet read and stored in the second step.

19 Claims, 7 Drawing Sheets

(56) References Cited

U.S. PATENT DOCUMENTS

| | | | |
|---|---|---|---|
| 2007/0156779 A1* | 7/2007 | Ho et al. | 707/201 |
| 2008/0201299 A1* | 8/2008 | Lehikoinen et al. | 707/3 |
| 2010/0115036 A1* | 5/2010 | Rosner et al. | 709/206 |
| 2010/0257203 A1* | 10/2010 | Sun | 707/780 |
| 2010/0332454 A1* | 12/2010 | Prahlad et al. | 707/654 |
| 2011/0099519 A1* | 4/2011 | Ma et al. | 715/811 |
| 2012/0215599 A1* | 8/2012 | Hayward | 705/14.4 |

OTHER PUBLICATIONS

Lesser et al., "Database Manager and Method and Computer Program for Managing a Database", U.S. Appl. No. 14/450,393, filed Aug. 4, 2014.

* cited by examiner

| field | type | content |
|---|---|---|
| Filename | Text | The path of the media clip |
| Filetype | Enum | The type of the file (audio, image or video) |
| Playable | Boolean | Indicates a playable fil, non-playable files will be ignored |
| Title | Text | The title of the item |
| Artist | Text | The performing artist |
| Album | Text | The name of the album |
| Composer | Text | The composer |
| Album-Artist | Text | The name of the artist publishing the album |
| NormTitle | Text | The normalized title of the item |
| NormArtist | Text | The normalized performing artist |
| NormAlbum | Text | The normalized name of the album |
| NormComposer | Text | The normalized name of the composer |
| Genre | Text | The genre |
| Track | Int:8 | The track number |
| Disc | Int:4 | The disc number |
| Published | Int:12 | When the item was first published (year only) |
| PlayCount | Int:16 | How many times the item was played |
| PlayDate | Date | When the item was played for the last time |
| AddDate | Date | When the item was added to the database |
| SkipCount | Int:16 | How often the user skipped this item during playlist playback |
| Thumbnail | Image | The 64x64 pixel JPEG image in the picture LRU cache |
| Parental control | Boolean | Parental control flag |
| Rating | Int:4 | Popularity of the item |

FIGURE 6

16 Gbyte USB stick with 3000 MP-3 files

| action | time |
|---|---|
| OS mount until first playback | 2 seconds |
| Completely scan filesystem and synchronize with database | 8 seconds |
| Read text metadata | 30 seconds |
| Read thumbnail information | 30 seconds |

160 Gbyte iPod classic with 30,000 music clips and libgpod

| action | time |
|---|---|
| OS mount until first playback | 2 seconds |
| Completely scan filesystem and synchronize with database | 15 seconds |
| Read text metadata | 0 seconds |
| Read thumbnail information | 240 seconds |

160 Gbyte iPod classic with 30,000 music clips with filesystem access

| action | time |
|---|---|
| OS mount until first playback | 2 seconds |
| Completely scan filesystem and synchronize with database | 45 seconds |
| Read text metadata | 30 seconds |

250 Gbyte USB-SSD-harddisk with 25,000 music clips

| action | time |
|---|---|
| OS mount until first playback | 2 seconds |
| Completely scan filesystem and synchronize with database | 15 seconds |
| Read text metadata | 700 seconds |
| Read thumbnail information | 700 seconds |

FIGURE 7

DATABASE MANAGER AND METHOD AND COMPUTER PROGRAM FOR MANAGING A DATABASE

FIELD OF THE INVENTION

The present invention is related to media processing such as audio processing, picture processing, audio/video processing or other media processing and particularly to a management of databases for media files.

BACKGROUND OF THE INVENTION

Media management is a process of managing and exposing the multimedia content to the viewer/listener. Traditionally, media management features were first introduced on personal computers (PCs) with applications such as Windows Media Player and Apple iTunes, as PCs were the first devices available to customers with ready access to a large number of multimedia titles such as MP3s files. In-vehicle infotainment followed later in the early 2000s, but with a somewhat reduced feature set and a reduced speed caused by limited hardware resources of a typical in-vehicle infotainment system of these times compared to a home PC.

The sizes of media databases have increased more and more due to the ready availability of audio files, video files or other media files such as e-book files or so. Straightforward media databases are, for example, located on memory sticks, optical media such as DVDs or BDs or CDs, or are located on portable players such as a portable music player, a portable media player, an e-book reader or a laptop or a tablet PC or so. Generally, many different portable devices exist on which databases are located.

On the other hand, stationary devices or, generally, host devices, exist which can for example be located in a car or in the living room of an individual. Typically, a user wishes to take her or his portable database and to attach her or his portable database to the host device which can be located for example in the car, in the living room or anywhere else where the individual wants to enjoy the media items on the database.

Due to the huge size of typical media databases, which has been made possible due to the rapid developments in storage possibilities, the attachment of an external database to a host device itself is not straightforward. It typically takes a long time until the host device has uploaded the database due to the large amount of media pieces. However, it is tedious for a user to wait such a long time between plugging the database into the host device and a successful search request to the database and an accompanying search result from the database. Due to the fact that the external databases are typically very different from each other, a standardized way of accessing the databases from the host directly is not available. Therefore, a straightforward way to access an external database consists in that the host device uploads the entire data from the database and after the upload is complete the host is in the position to answer a search request for media items in the database. As stated before, this uploading of data from the database to the host typically takes a long time due to limited transmission resources of, for example, a USB connector or a wireless connecting protocol. Therefore, this straightforward procedure is tedious for the user and therefore hinders the interchangeability of databases between different host devices.

SUMMARY OF THE INVENTION

It is the object of the present invention to provide an improved concept for managing one or more external databases.

In accordance with a first aspect, this object is achieved by a database manager for managing one or more external databases, comprising: a detector for detecting a connection of an external database to the database manager, wherein the external database comprises a plurality of media files, a database file system comprising a media identifier comprising a file name or a directory path name and an identification on the location of the media file on the external database, and metadata for each media file of the plurality of media files; a database synchronizer for reading and storing, as a first step, only at least a portion of the database file system and for reading and storing, when the at least a portion of the database file system is read, in a second step at least a part of the metadata; and a search request processor for processing a search request for a media file in parallel with the second step performed by the database synchronizer, wherein the search request processor is configured for providing a search result based on the media identifier from the database file system, even when the metadata for the media file is not yet read and stored in the second step.

In accordance with a second aspect, this object is achieved by a method of managing one or more external databases, comprising: detecting a connection of an external database, wherein the external database comprises a plurality of media files, a database file system comprising a media identifier comprising a file name or a directory path name and an identification on the location of the media file on the external database, and metadata for each media file of the plurality of media files; reading and storing, as a first step, only at least a portion of the database file system; reading and storing, when the at least a portion of the database file system is read, in a second step at least a part of the metadata; and processing a search request for a media file in parallel with the second step, wherein a search result is provided based on the media identifier from the database file system, even when the metadata for the media file is not yet read and stored in the second step.

In accordance with a third aspect, this object is achieved by a non-transitory storage medium having stored thereon a computer program for performing, when running on a computer, a method of managing one or more external databases, comprising: detecting a connection of an external database, wherein the external database comprises a plurality of media files, a database file system comprising a media identifier comprising a file name or a directory path name and an identification on the location of the media file on the external database, and metadata for each media file of the plurality of media files; reading and storing, as a first step, only at least a portion of the database file system; reading and storing, when the at least a portion of the database file system is read, in a second step at least a part of the metadata; and processing a search request for a media file in parallel with the second step, wherein a search result is provided based on the media identifier from the database file system, even when the metadata for the media file is not yet read and stored in the second step.

The present invention is based on the finding that it is not necessary to fully upload the entire database into the host device before a search request can be answered. Instead, it has been found that the entire database file system or at least a portion of this database file system is already sufficient for performing the first search requests. The database file system comprises an audio identifier comprising a file name or a directory/path name and an identification on a location of an audio file on the external database. This database file system is, for example, the file allocation table or any other file system structure indicating the names of the files and the paths to the files and the place on the external database where the actual audio data and/or metadata related to the audio data are located. The file structure is placed at a specified portion of the external database such as at the beginning or end of the storage space or at the first or last addresses of the entire address room of the storage space having stored the external database. Furthermore, the file system structure is typically included in a contiguous form, i.e. as a homogenous block on the storage device on which the external database is stored. Therefore, it is straightforward and quite universal to read a certain predetermined amount of data from the external database into the database manager. Then, as soon as a portion or the entire database file system is read-in, a search request processor can immediately start processing search requests. Hence, when a host receives a search request from a user, the search request can be executed with the database file system at hand and search results can be output. This is possible due to the fact that the users typically organize their databases so that the media files are already provided with semantically useful names. Hence, a certain path or directory will, for example, indicate the artist and a subdirectory will then comprise the songs from this artist. Typically, a file name for a song will include the entire name of the song or at least a portion of the entire name of the song. Therefore, search requests can be usefully processed only based on the database file system without having access to, for example, metadata related to the audio data or, of course the audio data itself. Although very detailed information is provided for media files in the form of metadata which always indicate the author, the name of the media piece and so on, the access to this metadata takes a long time and, therefore, if all metadata would have been read and stored by the database manager the user would have to wait a long time until the user can have her or his first search request answered. Therefore, as soon as a database synchronizer included in the database manager has read and stored, in a first step, at least a portion of the database file system, a search request processor can already process a search request for a media file. The search result will be based on the already read database file system and will typically already comprise a useful content due to the fact that the database file structure already includes useful semantic information on the content of the audio or video or generally media data. In parallel, i.e. for example as a background process, the database synchronizer will read and store, in a second step, at least a part of the metadata.

However, the reading of the metadata typically does not take only two seconds or so as the reading of the file structure, but may take for example twenty or forty seconds or even minutes. Naturally, when the user then makes a search request when the full metadata is read, the search result will exclusively or also be based on the metadata rather than on the file structure alone and will probably be more accurate. However, due to the fact that the user can already formulate search requests and receive results to the search requests before any metadata is read-in, the user is satisfied due to the rapid access to the database. The fact that no metadata is displayed on the display screen or so is not negatively noticed by the user, since the media content is already running.

In order to address this case as well, preferred embodiments intentionally retrieve the metadata for a selected media file in a kind of "interrupt process", so that the database synchronizer stops its straightforward volume scan, intentionally retrieves the metadata for the selected media piece and when this data is retrieved then the database synchronizer proceeds with the straightforward database scan during rendering the media piece. Typically, media pieces have a considerable playing time, and therefore it has been found that the database content is fully read-in after having played an average media piece.

The database scanning performed by the database synchronizer is preferably not only performed in two subsequent steps, but in more than two subsequent steps always with the purpose that the user can have ready access to the database as soon as possible and that the entire synchronization of the database takes place as a background process in parallel with providing search results or in parallel with playing searched media pieces.

Preferably, the database manager is configured for logging a history of earlier connected database volumes with unique database IDs. Furthermore, the database manager will store the data on databases read-in earlier. Then, when the database manager acknowledges that the actually connected database was connected to the database manager earlier, the earlier stored data is immediately provided for search requests. This makes sure that a user, who makes a search request to the newly connected database, has ready access to all earlier read and stored data and will receive a good and thorough search result based on the earlier content. However, databases can change over time and therefore the database manager is configured for actually checking each search result, i.e. whether this result is still located on the database, before the search result is displayed.

In parallel, however, the actual scanning of this database takes place in order to make sure that this database or specifically the data for this database is updated in the database manager to the actual state of the database.

BRIEF DESCRIPTION OF THE DRAWINGS

Preferred embodiments are subsequently discussed in the context of the accompanying drawings, in which:

FIG. 6 illustrates preferred metadata associated with media data, where the metadata is included in the data structure of FIG. 2*c*; and FIG. 7 illustrates performance results for different external databases.

DETAILED DESCRIPTION OF PREFERRED EMBODIMENTS

Figure 1:
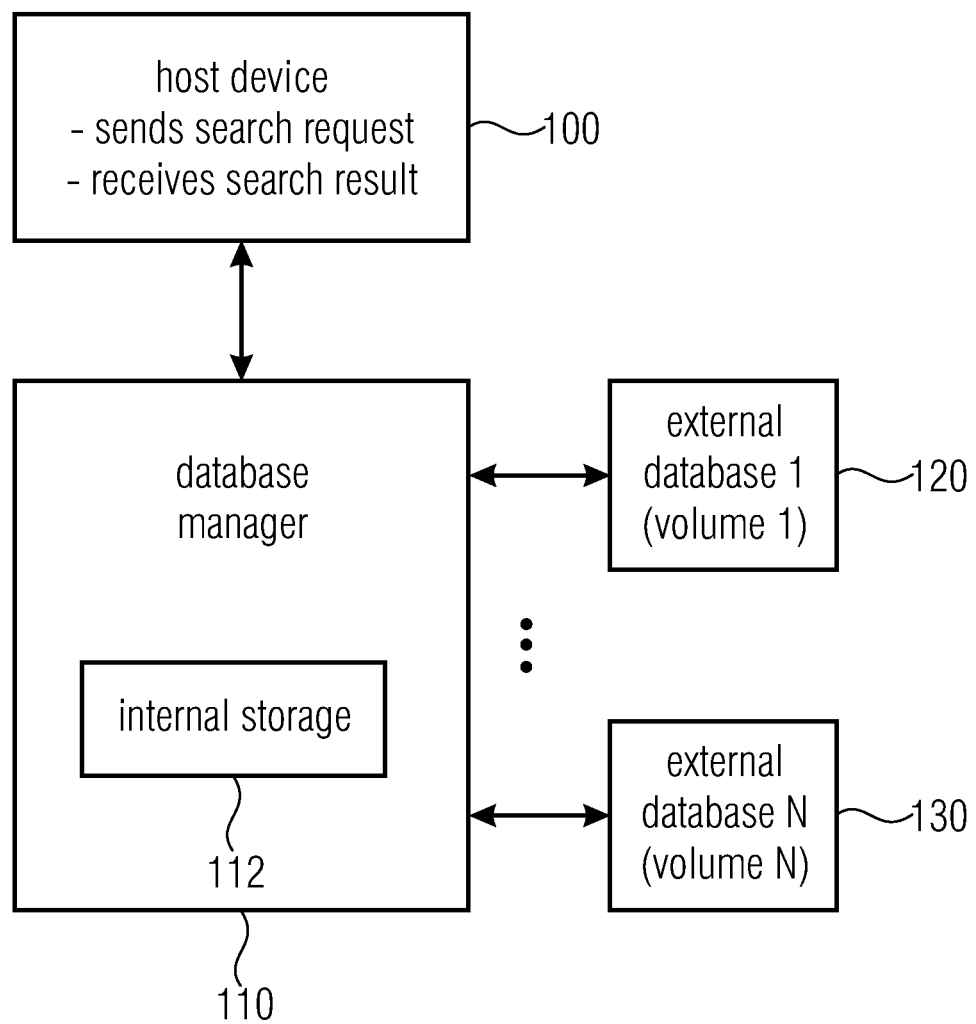
FIG. 1 is a system setup illustrating the relation between a host device, a database manager and external databases.

FIG. 1 illustrates a system setup comprising a host device 100, an associated database manager 110, a first external database 120 and exemplarily a further external database N 130. The host device 100 typically sends search requests to the database manager 110, and the database manager 110 replies with search results. To this end, the database manager 110 has an internal storage 112 which can, for example, be a persistent or non-volatile storage and/or a volatile storage such as a random access memory (RAM).

Figure 3:
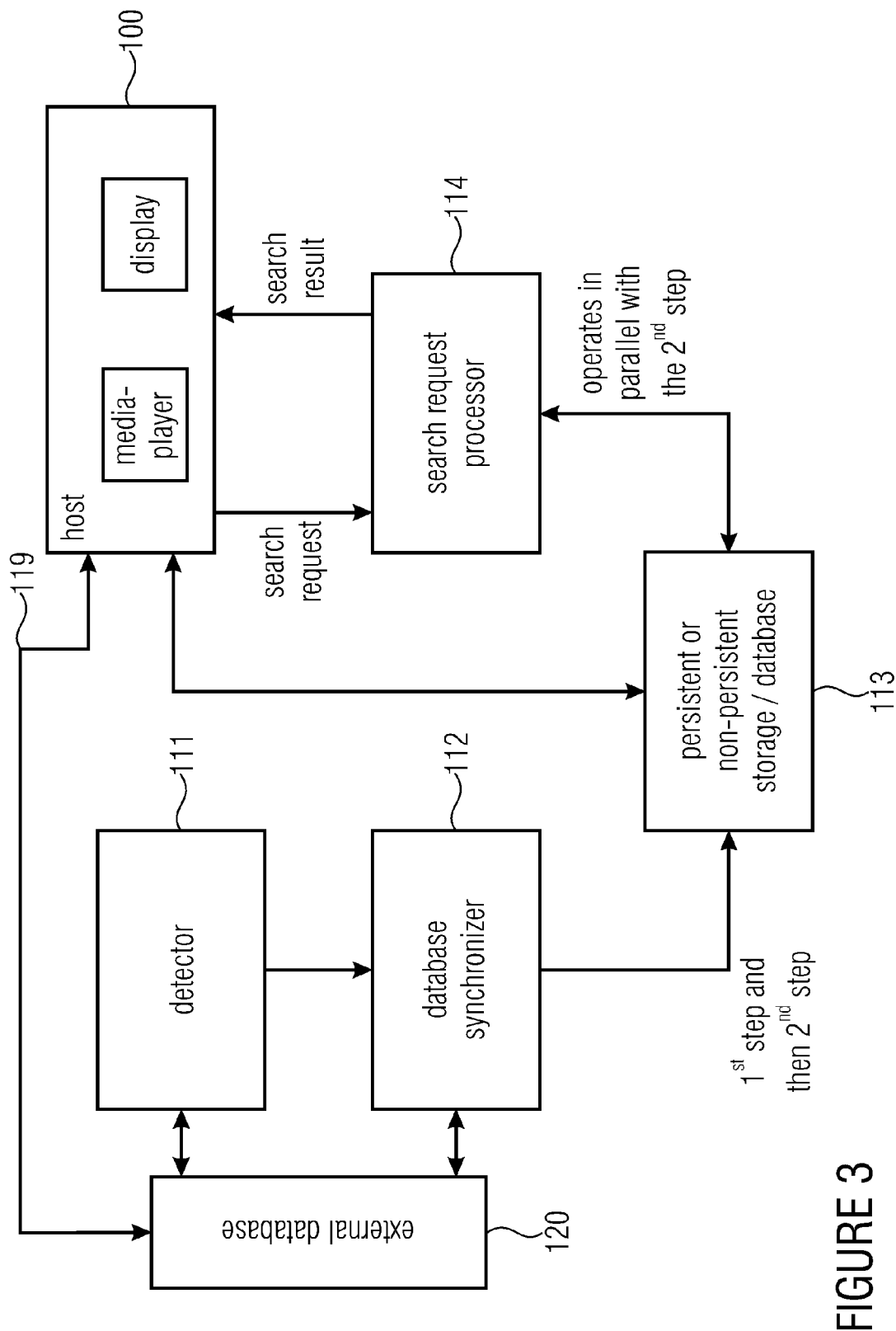
FIG. 3 illustrates a preferred embodiment of the database manager.

FIG. 3 illustrates a preferred embodiment of the database manager 110 for managing one or more external databases 120, 130. Specifically, the database manager comprises a detector 111 for detecting a connection of an external database 120 to the database manager. Typically, the external database 120 comprises a plurality of media files, a database file system comprising a media identifier comprising a file name or a directory path name and an identification on a location of the media file on the external database for each media file.

The database manager furthermore comprises a database synchronizer 112. The database synchronizer is configured for reading and storing, as a first step, only at least a portion of the database file system. When at least the portion of the database file system is read, the database synchronizer 112 continues with reading and storing, in a second step, at least a part of the metadata also included on the external database. Particularly, the external database therefore has for each media file a media file identifier which can be, for example, a file name or a directory path name or so. Furthermore, the external database has, for each media file, metadata and the media data themselves. However, the database synchronizer 112 only reads and stores, in the first step, at least a portion of the database file system or the entire database file system, but does not read in this first step the metadata associated with the media files indicated in the database file system, and also does not read-in any media files themselves. The reading of the metadata for the individual media files is only performed in the second step subsequent to the first step.

The database manager 110 additionally comprises a search request processor 114 for processing a search request for a media file or a plurality of media files in parallel with the second step performed by the database synchronizer 112, wherein the search request processor is configured for providing a search result based on the media identifier of the database file system, even when the metadata for this audio file is not yet read and stored in the second step performed by the database synchronizer 112.

For reading and storing, the database manager comprises a persistent or non-persistent storage or database 113.

Additionally, a host device 100 is illustrated in FIG. 3, which comprises a media player for playing media files and a display for displaying search results. Furthermore, the host comprises a user input device such as a keyboard, a touchscreen apparatus, a mouse, a track ball or any other input facility. In view of this input facility the user can formulate the search request and the host then provides the search request to the search request processor. The search request processor then accesses the storage/database 113 and when the second step is actually executed by the database synchronizer 112, then the search request processor operates in parallel with the second step in order to search through the media identifiers already read-in as a portion of the database file system. As soon as matching media identifiers are found, these media file identifiers are retrieved from the database 113 by the search request processor 114 and are forwarded as the search result to the host 100.

In parallel, the database synchronizer 112 completes reading in the entire database file system if, in the first step, only a portion of the database file system has been read-in. As soon as the entire file system is read-in, the database synchronizer proceeds with reading and storing in the storage 113 the metadata from the external database 120.

In accordance with an aspect of the invention, the media files themselves are not read-in from the external database 120 into the storage 113. Instead, depending on the implementation, the host 100 can directly access the external database as indicated via connection line 113, in order to retrieve the audio or video file at the position on the external database indicated by the identification on a location of the media file on the external database read-in as part of the database file system.

Alternatively, if the host 100 does not have direct access to the external database 120, then the search request processor 114 accesses the external database 120 and forwards the requested media data to the host 100. Furthermore, it is preferred that the host 100 is connected to the storage 113 in order to, for example, retrieve metadata to be displayed on the display of the host 100, for example in parallel with playing or rendering a media file. Alternatively, however, the search request processor 114 could also provide the data to the host so that the direct connection between the host 100 and the storage 113 is not necessary. Hence, the host 100 could only be connected to the search request processor in an embodiment, but in a different embodiment the host 100 can be directly connected to the external database 120 as well as to the storage 113. Other architectures for implementing the inventive functions are useful as well.

Figure 2A:
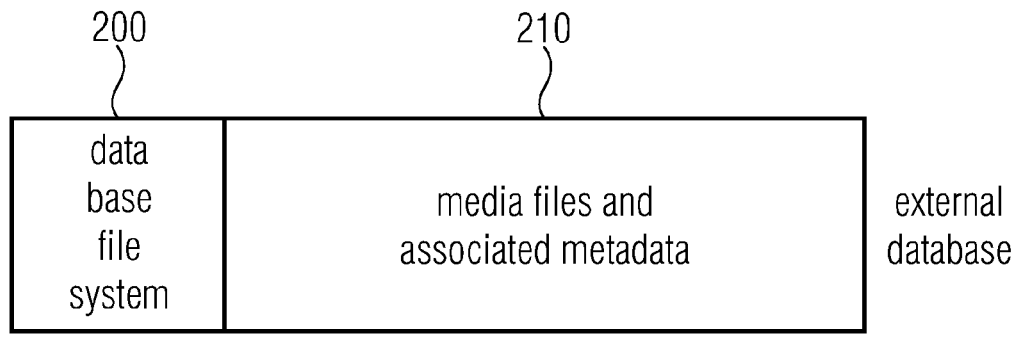
FIG. 2*a* illustrates the organization of an external database.

FIG. 2a illustrates an external database organized into a database file system storage block 200 and media files and associated metadata storage block 210. The external database comprises a plurality of media files in block 210, the database file system in block 200 and metadata for each media file of the plurality of media files again in block 210.

Figure 2B:
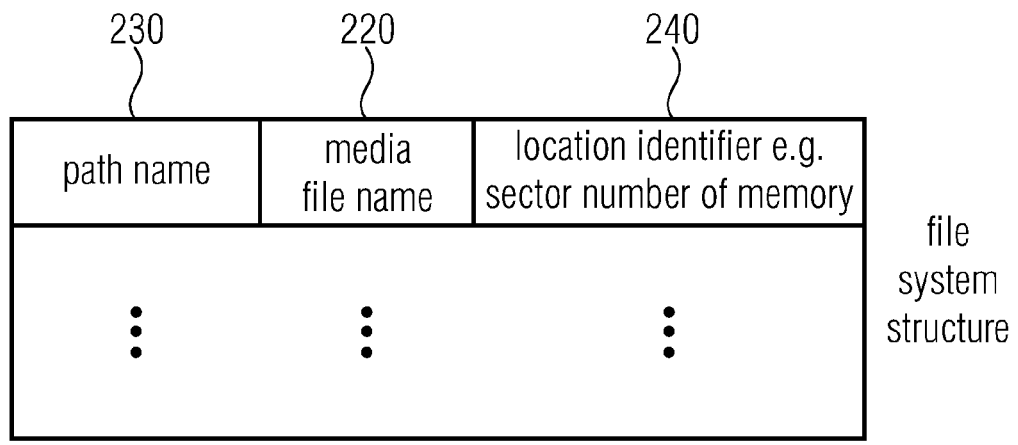
FIG. 2*b* illustrates a file system structure of the external database of FIG. 2*a*.

The database file system structure is illustrated in FIG. 2b. Hence, FIG. 2b is a more detailed representation of block 200 in FIG. 2a. Particularly, the database file system comprises a media identifier. The media identifier, for example, comprises a media file name 220, or a path name or a directory name 230 and a location identifier, i.e. an identification 240 on a location of the media file on the external database, such as a sector number of the memory, where in block 210 of FIG. 2a a certain media file starts. Typically, the database file system block 200 illustrated in more detail in FIG. 2b is located as a contiguous block of sectors on the external database. Hence, this data can be easily read-in in a very fast way due to the fact that a reading mechanism can simply read one memory sector after the other and a reading head or reading mechanism or so does not have to jump throughout the medium or throughout the logical or physical address room.

Figure 2C:
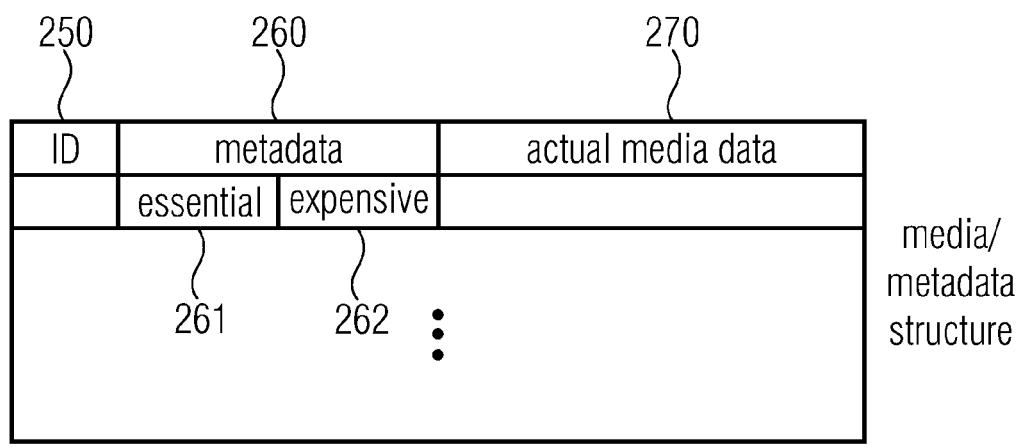
FIG. 2*c* illustrates the media files and associated metadata structure of the external database of FIG. 2*a*.

FIG. 2c illustrates a more detailed illustration of the media file/metadata block 210 of FIG. 2a. Particularly, in an implementation of an external database, block 210 is organized into an identification number 250, metadata 260 and the actual media data 270. Particularly, it is preferred to organize the metadata 260 into essential metadata 261 and so called "expensive" metadata 262. Basically, the metadata 260 are therefore organized into a first portion of metadata 261 and into a second portion of metadata 262. Preferably, the first portion 261 comprises the basic or essential metadata such as author, name of the song or so, while the second portion metadata typically has a larger number of bytes and, for example, comprises more information on the media data such as the text of a song or a thumbnail picture of the album, the artist or any other image information. Then, at 270, the actual media data is located, which is for example audio files, video files, picture files without sound or any other media file such as e-book files or so.

Typically, a device is a hardware component capable of providing media to the system. Examples for devices are an SD-card slot, a USB connector, a DVD drive, a hard disk, a USB stick. Devices can form a tree, and leaves can hold one or more volumes. A volume is a logical container for data. All volumes have certain properties like a unique identifier. An example of volumes are file systems, CD-DA discs, DVD-video discs, UPnP DMS, feeds or so.

Metadata represents information that describes the content of the primary data. As an example, an MP3 music file has, as the primary data, the MP3 music data, while the ID3 tag data like title, artist, length, etc. is the metadata. A media clip is a single media file that can be played back. Examples are MP3 files, MP4 video files, JPEG images or so. A media-item is a more complex structure than a media clip. It could contain playback information and also a collection of a media clips. Examples are a DVD-video disc or a playlist. Typically, the host can be a hardware device or can include the software that uses the services provided by the database manager.

Preferably, the database manager holds a metadata database in the storage 113. In the metadata database information to media files are stored to enable searching and faster access of this data. This service is intended to give the users information about the currently available media-clips or items. Whenever a volume is mounted for the first time, the host requests the database to make the newly arrived items available for users. It is preferably the responsibility of the host to make volumes available. Additionally, the database manager has a volume discovery functionality. The purpose of the volume discovery service is to monitor the mounting and unmounting of devices on the system as, for example, detected by the detector 111. The notification contains information about the volume, mount point, volume unit identifier and plug-in location. As soon as the discovery notification has been delivered, the database manager can resume any pending playback from this volume. If the suspended item still exists on the volume, the playback will resume in less than one second. If the mounted volume is an unknown audio CD, the initial metadata will be created from the CD-text data on the disc itself. Additionally, an online or offline available CD database will preferably be queried for more detailed information. This information will be used when the content of the disc is ripped to local storage.

The playlist manager service is preferably included in the database manager and particularly located in the search request processor 114. The playlist manager service is the instance that suggests the next item to play. It keeps named lists of media clips. There is one default list containing all items currently available. Other playlists are imported from the volume or are constructed by the user or by a third party software suggesting similar items. Other lists need to be constructed by the host or by third party add-ons that can add similar items to the item currently playing. Playlists have certain properties that control the selection of the next item to play.

A playlist may belong to a person and the playlist may be valid only in certain zones. The category describes the selection mode of this playlist, whether it is user defined, genre, artist, mood, third party suggestion, imported, etc. Furthermore, an external event property of playlists indicates the external event that might be associated with the playback of the particular playlist. A typical example of this would be the traffic situation or average vehicle speed which triggers a different mood the playback list. Information about the external event is set by the host via an API call. An interface to associate the playlist with the specific event is provided so that playlist generation plug-ins can use the playlist. The playback order can be sequential, random or shuffle play.

Subsequently, the architecture of the content database and the processes responsible for its creation and updates including preferably used plug-ins are discussed.

Requests to the database manager could be either synchronous or asynchronous. All requests that could take more than the typical 10 milliseconds to finish are designed to be asynchronous. The host 100 will issue a synchronous request and will get a unique token for each request issued from the search request processor 114 of FIG. 3. The results of the request will be reported by the search request processor 140 to the host through the mechanism of the callback function. Each notification will include the unique request token so that the host can associate the response with the request. All notifications will be delivered on the same thread, so it is the responsibility of the host to copy the provided data and return from the callback to allow other notifications to pass.

In an embodiment, a plurality of external databases are connected to the database manager. Then, the detector 111 is configured for detecting a plurality of external databases, wherein the database synchronizer 112 is configured for concurrently for reading and storing, as a first step, only at least a portion of the database file system 200 of each of the plurality of external databases and for reading and storing, when the at least a portion of the corresponding database file system is read, in a second step at least a part of the metadata 260 of each of the plurality of external databases, and wherein the search request processor 114 is configured for processing a search request for a media file in parallel with the second step performed by the database synchronizer for each of the plurality of external databases, wherein the search request processor 114 is configured for providing a search result based on the media identifier from the database file system from each of the plurality of databases, even when the metadata for the media file is not yet read and stored in the second step. Due to the concurrent operation of scanning and searching in more than one database, a higher flexibility and user comfort can be reached, particularly, when one or all of the external databases are not connected directly to the database manager, but are connected in a distributed manner, e.g. by a TCP/IP, a WIFI or a MOST connection.

Due to the different natures of the requests, it is possible that requests will not trigger a notification, a single notification or more than one notification. After a notification that the new volume has arrived in a zone, the host sends a request to the database to make this volume available for browsing in the database. The host can decide which zones can accept the data from this volume. Zone access to media is limited to complete volumes, i.e. there will be no file/directory based access grants.

The database manager is designed in a unique way in order to meet special requirements of the media management while aiming for the maximum performance. Because of this, the database manager design is specialized and customized and does not rely on using off-the-shelf relational databases.

Each individual volume of the external volumes 120, 130 of FIG. 1, for example, is managed and indexed independently. This approach allows faster responses if a volume is mounted/unmounted. If the database recognizes a remount of a volume with an already known unique identifier, the associated data stored in the persistent database (storage 113 of FIG. 3) is returned at once so that the user can already browse and search the volume without a need to repeat the synchronization process all over again, which is typically performed by the database synchronizer 112 of FIG. 3. Nevertheless, the database synchronizer 112 starts in the background to synchronize the data set by first scanning all directories/files and to match these directories/files with the persistent state. Therefore, preferably the database synchronizer 112 performs the first step of reading the database file system of the remounted external database (volume) and decides on this data where changes to the file structure have been done. When it is determined, for example, that a complete folder has been added and no additional changes have been performed, then it is sufficient to only scan in the second step the metadata related to the new folder, but regarding the other data on the volume the data stored earlier is still valid and can be further used. When it is determined that the database file system stored earlier is identical to the newly read database file system, then it is decided that the remounted volume has not been changed by the user and therefore no action by the database synchronizer 112 is necessary. However, when it is determined that the similarities of the database file system actually read and stored for the same volume earlier are small or no longer present, then a complete scan of the remounted volume is performed in the same way as if the volume would have been mounted for the first time. Naturally, the data of this remounted volume which has been considerably changed by the user in the meantime stored in the persistent storage is overwritten and replaced by newly read and stored data obtained via the first step and the second step by the database synchronizer 112.

The database 113 in the database manager is preferably organized with a fixed record size. All texts are stored in a dictionary. Dictionary items can be referenced by multiple entries. The database contains all directories and all files matching certain criteria, i.e. file extensions.

With regard to persistent storage, the database 113 can be operated with two distinct operating modes. The first mode or persistent mode is the default mode of operation of the database manager, and it requires persistent storage on the system, i.e. a flash memory, a hard disk storage, etc. A persistent I/O operation could be optionally and temporarily blocked by enforcing external policy in case the vehicle, on which the database manager is running, is in a special mode of operation that disallows persistent storage, such as ignition, abnormal voltage conditions caused by an external non-ignition event, etc.

The other mode is the RAM mode. This mode of operation is basically "persistency-less", which means that a database service will not use any other storage except the system's random access memory (RAM). This mode of operation could be particularly useful in lower-specification systems where costs of the built-in persistent storage could be prohibitive.

Database service exposes quota management configuration options that allow the host to define an upper limit of the data stored. For example, thumbnails included in metadata representing an item are stored in an LRU cache (least recently used), which size can simply be adjusted. For the configuration purposes, two separate sets of limits exist for persistent mode and RAM mode of operation. The reason for the two parameter sets is to allow potential scenarios where persistent storage could be dynamically attached/detached, since it is reasonable to expect that quota/LRU cache limits will differ significantly for different types of storage memory (persistent/RAM).

Each database not used will have an associated score based on the last usage data and number of mount sessions. This score will be used for purposes of cleanup in case quotas are to be reached. The cleanup "aggressiveness" and thresholds that trigger the cleanup are configurable. Therefore, the storage 113 keeps a record of each earlier connected database where all the data read-in by the database synchronizer 112 remain stored. Therefore, when the user has connected, for example, sequentially or in parallel, five different external databases, then the database manager keeps five records, i.e. one record for each database, where at least the database file system for each database and the read and stored metadata of each database remain stored and are, again, used when it is detected that an earlier connected database is again connected.

The database manager is designed for allowing the quickest possible accessibility to "useful" data in order to achieve quick HMI or search result responses. Furthermore, a background updating in "packets" takes place so that the host HMI or the search request processor 114 can refine the list of indexed content/metadata as the database 113 is being updated. In order to achieve these design goals, the database creation process is preferably performed in five separate steps as discussed in the context of FIG. 5.

These steps are preferably performed by the database synchronizer. In step 1, a quick file system scan is performed. If a new volume arrives in the system, the database synchronizer 112/the database first reads a reasonable (configurable by the host) number of the database file system items to allow a first overview and allow the host to quickly search for and select an item to start any playback if requested. The data read-in in step 1 corresponds to the "first step" illustrated in FIG. 3. In particular, either all or at least a portion of the database file system is read-in in this quick file system scan step 1.

Figure 5:
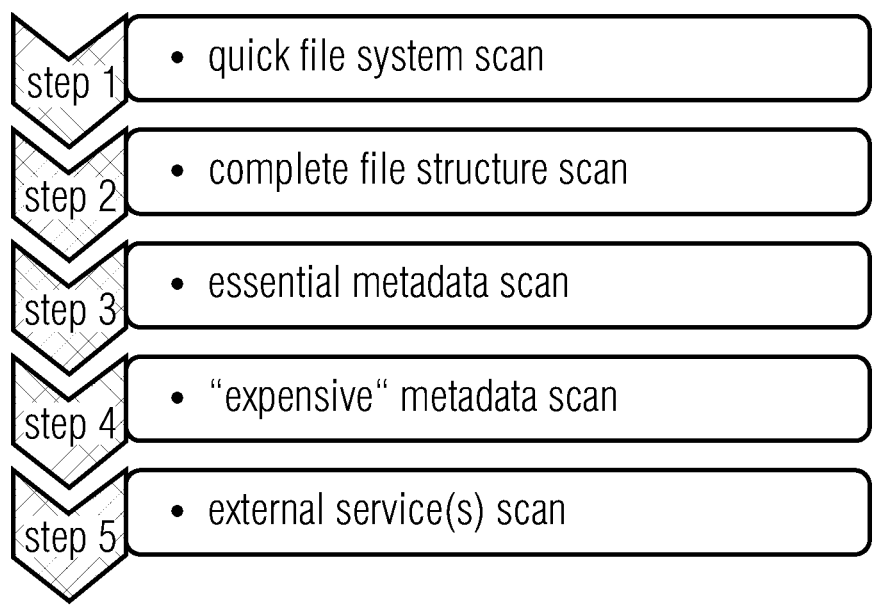
FIG. 5 illustrates a sequence of steps performed by the database synchronizer in a preferred embodiment.

Following step 1, step 2 is performed which represents a complete file structure scan. After the quick file system scan, the database synchronizer 112 turns into background processing and starts reading the complete file structure of the volume in order to build a complete data set. This initial data set contains the file names or path names only, but this time the complete volume file structure is known and stored in the database while, after step 1, only a portion of the complete volume file structure was known and stored in the database 113. Therefore, when the first step performed by the database synchronizer comprises reading not only at least a portion of the database file system but the whole database file system, then steps 1 and 2 of FIG. 5 both constitute the "first step" performed by the database synchronizer 112. Then, FIG. 5 illustrates three further steps 3, 4 and 5 which all constitute the "second step" performed by the database synchronizer 112 of FIG. 3.

Specifically, step 3 represents an essential metadata scan. In this step, the database/the database synchronizer 112 starts to read and process the actual metadata belonging to each file found on the volume. In regular (configurable) intervals, the reading of metadata is interrupted to re-index the database and to inform the host about the progress made in the metadata scanning. Re-indexing of the data is useful in order for the database to be capable of servicing search requests. Step 3 is specifically directed to only scanning the essential metadata illustrated at 261 in FIG. 2c and not scanning, at this point in time, the expensive metadata 262. The scanning of the expensive metadata 262 is then performed in step 4 relating to the expensive metadata scan. After all essential metadata has been transferred into the database, the database synchronizer 112 will start to scan for additional "expensive" data (in time/processing terms), i.e., thumbnail information that could be used for, for example, more advanced HMI or search result presentation. Hence, expensive with respect to essential means that the amount of data and the way of accessing or acquiring this data is less time intensive or less processing intensive for essential metadata but is more time intensive and more processing intensive for expensive metadata.

A further optional step number 5 can be performed by the database synchronizer 112 if adequate plug-ins are present and enabled. Then, the database synchronizer 112 can ask third-party modules for extended metadata information which is missing in the in-item metadata (metadata stored on the external database) and can be downloaded from internet services known under the term Gracenote™ or Rovi™ and this data obtained can then be added to the database. The host can, at any time, request that certain records will be handled with high priority, for example data for the items that are currently displayed are prioritized in order to improve the HMI or search result response times.

Figure 4:
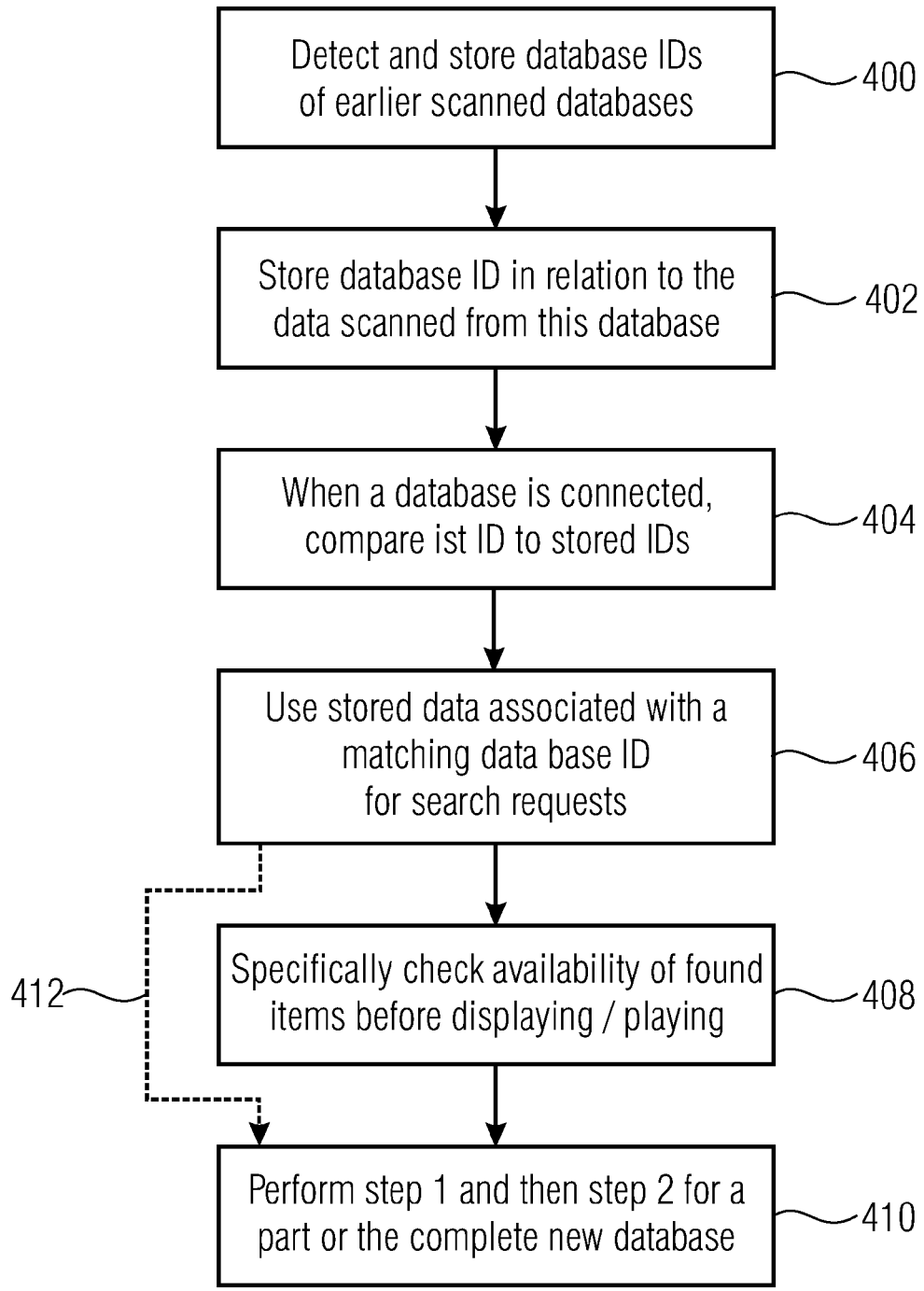
FIG. 4 illustrates a flowchart of the inventive process of handling databases which were connected earlier and are reconnected to the database manager.

Upon successful mounting and detection, a specific procedure is performed for detecting an already known (indexed) volume, when it is remounted. This procedure is advantageous, when the data read from the database last time this volume was present, is still available in the persistent storage 113 of FIG. 3. The preferred procedure is illustrated in FIG. 4.

In step 400, database identifications (IDs) of earlier scanned databases are detected and stored, preferably by the detector 111 of FIG. 3. Furthermore, these earlier connected database IDs are stored in relation to the data records scanned from the corresponding earlier connected database as outlined in step 402. Then, when a new database is connected, the detector 111 is configured for retrieving the ID from the newly connected external database 120 and to compare this ID with the record of stored IDs as indicated in step 404. A check for the availability of found items before displaying or playing these found items is performed due to the fact that it cannot be guaranteed that the newly mounted volume has not been changed in the meantime. Parallel or subsequently step 410 is performed, i.e., the database synchronizer 112 performs step 1 and then step 2 for a part or the complete newly connected database if there have been changes to the external database. Specifically, when only new data has been added which is determined by the database file system, only the metadata related to the new data is scanned in step 2. However, when it is determined that significant changes have been performed to most or all data items, then a complete re-scan is performed as if this database is connected to the database manager for the first time. Preferably, steps 408 and 410 take place in parallel to each other as indicated by the hatched line 412. However, these steps can also be performed in sequence to each other.

Hence, the search request processor 114 will make all the indexed metadata immediately usable for processing search requests from the host. The goal is to achieve shortest possible times between the "known" volume detection and the ability of the host to present it to the user.

Immediately afterwards, the current file system is scanned in the background and any relevant modifications on the file system are recognized and the database is them amicably updated accordingly. If the volume had been removed before the database building was completed, the build process will resume after the database has been synchronized completely, and will check again the whole volume.

As long as the database is not yet synchronized, it is preferred that the search request processor 114 or any other internal mechanism will avoid that the items which have been removed from the remounted volume (before remounting) will appear in search-results and will avoid such items being used in the playback or playlist component. The internal mechanism works, for example, in that each item which should appear in a search result or which is about to be played or is part of a playlist is individually checked to see if it is still existent by checking the directory of the file system for this single file. If it is not existent anymore it will not appear in search results, is not being played, and is not part of this playlist anymore.

Specifically, there can be the situation that the host device has a display with a limited display space. When, for example, a search in a re-mounted database results in a number of hits which is higher than the number of hits which can be concurrently displayed on the display, then the search request processor only individually checks the hits which can be displayed in order to get a quick access time and search result time. When it is determined that, for example, among the first ten results which can be displayed, only eight results are actually present in the re-mounted volume, then the two next results in the result list are individually checked and this is continued until enough results which actually exist in the re-mounted volume have been found so that the display can take place and the display space can be filled partly, for example, by more than 50% or can be completely filled.

Furthermore, database requests contain the issuing zone. Depending on this zone information, a combiner will receive the individual results from each of the selected partial databases and combine them to the zone dependent result. The response will inform the host about the number of matches.

FIG. 6 illustrates an organization of the database 113. The database will contain only the fields required to find and display items. Other data needs to be extracted from the original file. Since all items presented to the host are located on media currently mounted, the physical item is always available. Norm fields are filled in by a third party database to allow consistent, language correct sorting of the items. The other text fields can be modified by the host to allow custom entries. The playable field is for internal use only. The database will never report items to the hosts that have this flag set. The host can set this flag on a file if the playback service encounter serious problems with an item. It is possible to reset all playability fields in a database by API calls.

Preferably, only the first field "file name" is filled in the first step, i.e., in the file system scan, and based on this information, a search request can already be performed and a useful search result can be brought back due to the fact that file names typically have the semantically useful expression semantically describing the media file by title, author or both.

A creation of row sets is done by issuing search requests to the database. The host preferably needs to determine the columns to search and to sort. The host can either search for complete words or match the start of words. For hosts with a limited result display area, the database can create suggestions of items that match the search. The database can provide the host with a list of all words available to feed a speech engine with possible matches. The database request processor 114 which preferably performs all those tasks will respond with temporary record IDs which allow for fast retrieval of the data of the record but cannot be used for persistency. The database supports converting the temporary record ID into unique long term IDs and vice versa. When not searching for individual titles, the database will also report information to group the matching records into easier to browse categories. The host can decide the granularity of this group creation.

The database manager is configured for using a plug-in system for database creation and updating. Hence, the notion of "device" and "volume" is abstracted and consequently offers extensibility for future types of media. Database plug-ins could be divided into two distinct classes. One class is related to file system based plug-ins. This class of plug-ins abstracts a volume as a "file system". This approach is natural for any kind of device/volume that could be presented as a file system (list of files and directories). Typically, devices/volumes of this sort are USB sticks, SD/CF cards, HDD/SSD storage, CD/DVD media but they could also abstract different types of media stores such as UPnP™ servers, etc.

The other class is related to bypass plug-ins. This class of plug-ins is tailored for devices that already have their own metadata databases and those databases could exist directly. A typical example of this class of device is the iPod of Apple™.

The database manager provides a specialized database service plug-in which is tailored for the purpose of enriching multi-zone in-vehicle infotainment, where a vehicle could be equipped with multiple separate infotainment systems such as a head unit and a front unit where each of these systems could serve different zones. In this arrangement, it is desirable to offer the ability to access data belonging to a physically different infotainment unit, for example the rear passenger could plug-in her or his Apple iPod and a front passenger would like to be able to search through the database which would by physically located in the rear/front infotainment unit. In order to achieve this functionality, the Meta Sync plug-in will synchronize the local database with the relevant foreign database records after the device becomes available in a foreign entertainment unit. The Meta Sync will synchronize only records belonging to the devices, volumes and sounds that are configured to be shared with foreign units and only volumes that offer capability of being shared via remote access protocols present on the system (NFS/SMB). During the Meta Sync synchronization process, records are being appropriately converted with respect to the content URI (for example, local storage becomes NFS/SMB share).

The Meta Sync server relays mount/unmounts notification and metadata availability (including each single step of the database creation process) to the registered Meta Sync clients on the network. The Meta Sync server can be configured to support an arbitrary number of clients or to impose certain limits configurable by the host. The Meta Sync server will only broadcast notification messages and metadata availability belonging to the zones/devices that are configured to be sharable. The Meta Sync client serves as a gateway that reacts on foreign device notifications and metadata availability announced by Meta Sync servers across the network. It is a responsibility of the Meta Sync client to relay the network messages to the local database service and perform the background synchronization (and URI translation) of the available metadata for each step of the database creation process performed by the database manager. The Meta Sync server and client are fully configurable by the host so different project-specific trade-offs between speed/performance and CPU/network resources can be achieved.

The Following client options are configurable by the host. The maximum overall CPU load (in percents) above which the background sync will pause; sampling interval for checking the CPU resources (in seconds); which of the different steps of the media management database creation process performed by the database manager should be synced.

The following server options are configurable by the host: the maximum number of clients that could be concurrently supported; the maximum network bandwidth consumed (in kbit/s, could be unlimited); a sampling interval for checking the network resources (in seconds); and the iterative sending of data (threshold).

The Meta Sync client/server communication protocol is network-hardware agnostic and with specific implementations for TCP/IP (Ethernet/WiFi) and MOST networks. The meta Sync server can send data iterative in packets upon creation in order to improve latencies, memory consumption and speed.

For supporting iPod devices, the data manager provides a prebuilt version of the libgpod or immediate metadata access of items stored on Apple devices (iPod, iPhone, iPad). Because these devices contain a well known metadata database it is not required to do the lengthy process of discovering and retrieving the metadata on this device type. This significantly speeds up the process of synchronization and metadata resourcing.

FIG. 7 illustrates several examples indicating the performance of the present invention due to the inventive step-by-step of reading data from the external database.

It can be seen that the OS mount until first playback is about two seconds for all given examples in FIG. 7. This is obtained by performing the step-by-step procedure preferably in accordance with FIG. 5 but, in general, by firstly only reading in at least a portion of the database file system and reading the metadata thereafter. It is even visible from FIG. 7 that, when the quick file system scan is performed, a response time until two seconds is obtained while even the complete file structure scan, in accordance with step 2 of FIG. 5, requires between 8 and 45 seconds in the examples. Then, step 3 can be compared to the line "read text metadata" which takes a considerable amount of times except for Apple devices, for which the specific libgpod application is used. It becomes clear that the expensive metadata scan, in accordance with step 4, which, for example comprises thumbnail information, requiring a considerable amount of time e.g., even about 11 minutes (700 seconds) for a large USB/SSD hard disk with 25,000 music clips.

In view of this, the considerable improvement of the present invention can be seen due to the fact that, for all devices irrespective of their size, a response time until the first playback of 2 seconds is achieved which is readily acceptable for users and, subsequently, this playback takes place in parallel with the other scan operations and synchronization of operations indicated in FIG. 7.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A database manager system for managing one or more external databases, comprising:
   a detector to detect a connection of an external database to the database manager, wherein the external database includes a plurality of media files, a database file system including, for each of the plurality of media files, a media identifier including a file name or a directory path name of the corresponding media file and an identification of the location of the corresponding media file in the external database, and metadata for each of the plurality of media files;
   a database synchronizer programmed to read and store, as a first step, only at least a portion of the database file system including the file names or the directory path names for at least a subset of the plurality of media files and not to read or store the metadata for the plurality of media files, and further programmed to read and store, when the file names or the directory path names for at least the subset of the plurality of media files of the database file system have been read, in a second step at least a part of the metadata for the plurality of media files; and
   a search request processor programmed to process a search request for a media file of at least the subset of the plurality of media files by accessing the file names or the directory path names of the database file system for at least the subset of the plurality of media files and by not accessing the metadata of at least the subset of the plurality of media files in parallel with the second step performed by the database synchronizer, wherein the search request processor is programmed to provide a search result based on the file names or the directory path names for at least the subset of the plurality of media files from the database file system, even when the metadata for the plurality of media files have not yet been read and stored by the database synchronizer in the second step; wherein
   the metadata for each media file includes a first portion of essential metadata and a second portion of expensive metadata;
   the database synchronizer is programmed to read and store, in the second step, essential metadata of each media file found on the external database and to then read and store the expensive metadata found on the external database for each media file; and
   at least one of the detector, the database synchronizer, and the search request processor is implemented as a hardware that executes instructions stored in a memory.

2. The database manager system in accordance with claim 1,
   wherein the database synchronizer is programmed to read and store, in the first step, a predetermined amount of data from the database file system and to continue reading and storing a remainder of the database file system when a total amount of database file system exceeds the predetermined amount of data.

3. The database manager system in accordance with claim 1, wherein the database synchronizer is programmed to request further metadata from an external metadata provider for media files, for which these further metadata are not stored on the external database.

4. The database manager system in accordance with claim 1,
   wherein the search request processor is programmed to provide a search result as soon as at least the portion of the database file system is read and stored in a storage, wherein the database synchronizer is programmed to read and store, in the second step, in parallel to the search request processor providing the search result.

5. The database manager system in accordance with claim 1, further comprising a media player programmed to play a media file included in a search result provided by the search request processor, wherein the media player is programmed to access the external database at a memory location, where the media file is stored, wherein the memory location is identified by the identification on a location of the media file on the external database read and stored in the first step by the database synchronizer.

6. The database manager system in accordance with claim 1,
   wherein the external database includes a unique database ID and wherein the detector stores the unique database ID in relation to the data read and stored by the database synchronizer from the external database.

7. The database manager system in accordance with claim 6,
   wherein the detector acquires, when a further external database is connected, a unique identification of the further external database, to compare the unique ID of the further database with stored database identifications, and to control the search request processor to access to the database file system and metadata associated with the unique identification, when the unique identification of the further database matches with a stored unique identification, by accessing a memory on which the database file system and the metadata are stored in association with the unique identification.

8. The database manager system in accordance with claim 7, wherein:
   the search request processor is programmed to provide a search result using the data associated with the stored unique identification matching with the unique identification of the further external database, and the search request processor is programmed to specifically check whether media files in the search result are actually located on the further external database and to only provide the search result with the media files, when the check was positive.

9. The database manager system of claim 8, further comprising a display including a limited amount of display space, wherein the search request processor is programmed to only specifically check media files to be displayed on the limited amount of display space and to not specifically check or later specifically check media files not to be displayed due to the limited amount of display space.

10. The database manager system in accordance with claim 1, wherein the external database is a memory stick, a hard disk drive, a storage device, an optical disk or a portable audio or video player having a stored audio or video file database.

11. The database manager system in accordance with claim 1, wherein the database synchronizer is programmed to store data read in the first step and in the second step on a memory implemented as a persistent non-volatile memory.

12. The database manager system in accordance with claim 1, wherein:
the detector detects a plurality of external databases,
the database synchronizer is programmed to concurrently read and store, as a first step, only at least a portion of the database file system of each of the plurality of external databases and to read and store, when the at least a portion of the corresponding database file system is read, in a second step at least a part of the metadata of each of the plurality of external databases, and
the search request processor is programmed to process a search request for a media file in parallel with the second step performed by the database synchronizer for each of the plurality of external databases, wherein the search request processor is programmed to provide a search result based on the media identifier from the database file system from each of the plurality of databases, even when the metadata for the media file is not yet read and stored in the second step.

13. The database manager system of claim 1, wherein:
the database file system includes a file allocation table including the file names or the directory path names for at least a subset of the plurality of media files of the database file system, and
the database synchronizer is programmed to read and store, in the first step, only the file names or the directory path names and to not read and store, in the first step any metadata for at least the subset of the plurality of media files.

14. The database manager system of claim 1, wherein:
the file names or the directory path names for at least a subset of the plurality of media files of the database file system are located at a specified portion of the external database, the specified portion being one of a beginning of a storage space, an end of the storage space, a first address of an entire address room, and a last address of the entire address room, and
the database synchronizer is programmed to read and store, in the first step, at the specified portion.

15. The database manager system of claim 1, wherein:
the database file system including the file names or the directory path names for at least a subset of the plurality of media files is stored in a contiguous form as a homogeneous block of data on a storage device, on which the external data base is stored, and
the database synchronizer is programmed to read and store, in the first step, only the homogeneous block of data.

16. The database manager system of claim 1, wherein the file names or the directory path names of the database file system include semantically useful names.

17. The database manager system of claim 1, wherein the search request processor is programmed to process a further search request for a media file, when the metadata have been read and stored by the database synchronizer in the second step, by accessing the read and stored metadata exclusively or by accessing the read and stored metadata and the read and stored database file system having the file names or directory path names for the plurality of media files.

18. A method of managing one or more external databases, comprising:
detecting a connection of an external database, wherein the external database includes a plurality of media files, a database file system including, for each of the plurality of media files, a media identifier including a file name or a directory path name of the corresponding media file and an identification of the location of the corresponding media file in the external database, and metadata for each of the plurality of media files;
reading and storing, as a first step, only at least a portion of the database file system including the file names or the directory path names for at least a subset of the plurality of media files of the database file system and not reading or storing the metadata for the plurality of media files;
reading and storing, when the file names or the directory path names for at least the subset of the plurality of media files of the database file system is read, in a second step at least a part of the metadata for the plurality of media files; and
processing a search request for a media file of at least the subset of the plurality of media files by accessing the file names or the directory path names of the database file system for at least the subset of the plurality of media files and by not accessing the metadata of at least the subset of the plurality of media files in parallel with the second step, wherein a search result is provided based on the file names or directory path names for at least the subset of the plurality of media files from the database file system, even when the metadata for the plurality of media files have not yet been read and stored in the second step; wherein
the metadata for each media file includes a first portion of essential metadata and a second portion of expensive metadata; and
the database synchronizer is programmed to read and store, in the second step, the essential metadata of each media file found on the external database and to then read and store the expensive metadata found on the external database for each media file.

19. A non-transitory storage medium having stored thereon a computer program for performing, when running on a computer, a method of managing one or more external databases, comprising:
detecting a connection of an external database, wherein the external database includes a plurality of media files, a database file system including, for each of the plurality of media files, a media identifier including a file name or a directory path name of the corresponding media file and an identification of the location of the corresponding media file in the external database, and metadata for each of the plurality of media files;
reading and storing, as a first step, only at least a portion of the database file system including the file names or the directory path names for at least a subset of the plurality of media files of the database file system and not reading or storing the metadata for the plurality of media files;

reading and storing, when the file names or the directory path names for at least the subset of the plurality of media files have been read, in a second step at least a part of the metadata for the plurality of media files; and processing a search request for a media file of at least the subset of the plurality of media files by accessing the file names or directory path names of the database file system for at least the subset of the plurality of media files and by not accessing the metadata of at least the subset of the plurality of media files in parallel with the second step, wherein a search result is provided based on the file names or the directory path names for at least the subset of the plurality of media files from the database file system, even when the metadata for the plurality of media files have not yet been read and stored in the second step; wherein the metadata for each media file includes a first portion of essential metadata and a second portion of expensive metadata; and the database synchronizer is programmed to read and store, in the second step, the essential metadata of each media file found on the external database and to then read and store the expensive metadata found on the external database for each media file.

* * * * *